(12) United States Patent
Dittenhofer et al.

(10) Patent No.: US 9,810,268 B2
(45) Date of Patent: Nov. 7, 2017

(54) BEARING ARRANGEMENT

(71) Applicant: Schaeffler Technologies AG & Co. KG, Herzogenaurach (DE)

(72) Inventors: Thomas Dittenhofer, Humprechtshausen (DE); Stephan Popp, Emskirchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 99 days.

(21) Appl. No.: 14/893,763

(22) PCT Filed: May 13, 2014

(86) PCT No.: PCT/DE2014/200211
§ 371 (c)(1),
(2) Date: Nov. 24, 2015

(87) PCT Pub. No.: WO2014/198269
PCT Pub. Date: Dec. 18, 2014

(65) Prior Publication Data
US 2016/0123400 A1    May 5, 2016

(30) Foreign Application Priority Data
Jun. 13, 2013   (DE) .................. 10 2013 210 987

(51) Int. Cl.
*F16C 41/00*    (2006.01)
*F16C 35/078*    (2006.01)
(Continued)

(52) U.S. Cl.
CPC ............ *F16C 41/004* (2013.01); *F16C 13/02* (2013.01); *F16C 23/06* (2013.01); *F16C 23/08* (2013.01); *F16C 35/042* (2013.01); *F16C 35/078* (2013.01)

(58) Field of Classification Search
CPC ......... F16C 23/06; F16C 25/06; F16C 35/077
See application file for complete search history.

(56) References Cited

U.S. PATENT DOCUMENTS 1,584,828 A    5/1926   Wood
3,009,748 A *  11/1961  Pitner ................. F16C 19/46
                                                    29/898.057
(Continued)

FOREIGN PATENT DOCUMENTS

AT    141909      1/1935
DE    19919733    11/1999
(Continued)

*Primary Examiner* — Phillip A Johnson
(74) *Attorney, Agent, or Firm* — Volpe and Koenig, P.C.

(57) ABSTRACT

The invention relates to a bearing arrangement (12) for a part to be mounted such that the part rotates about an axis, such as a cylinder, roller, drum or shaft, comprising at least one rolling bearing (23), which is accommodated in a bearing housing (27), which is mounted movably in an arrangement housing (29) in a linearly movable manner by at least one linear guide (28), and also including an actuation device (1) for effecting a linear shifting movement of the bearing housing perpendicularly to the axis between a rest position and a working position. The actuation device includes at least one prestressed spring element, which presses the bearing housing into the working position, and at least one hydraulic or pneumatic device for generating a restoring force acting counter to the spring element for moving the bearing housing into the rest position.

9 Claims, 2 Drawing Sheets

(51) Int. Cl.
  *F16C 13/02* (2006.01)
  *F16C 23/06* (2006.01)
  *F16C 23/08* (2006.01)
  *F16C 35/04* (2006.01)

(56) References Cited

U.S. PATENT DOCUMENTS

| | | | |
|---|---|---|---|
| 3,786,742 | A | 1/1974 | Hertrich |
| 7,011,023 | B2 | 3/2006 | Dittenhofer et al. |
| 7,779,757 | B2 | 8/2010 | Schafer et al. |
| 8,001,895 | B2 * | 8/2011 | Schneider ............... B41F 7/26 101/350.1 |
| 8,006,617 | B2 * | 8/2011 | Schneider ............... B41F 7/26 101/351.1 |
| 8,069,785 | B2 * | 12/2011 | Schafer ............... B41F 13/30 101/136 |

FOREIGN PATENT DOCUMENTS

| | | |
|---|---|---|
| DE | 10145322 | 4/2003 |
| DE | 102004037888 | 10/2005 |
| DE | 102005045987 | 4/2007 |
| DE | 102008001546 | 11/2009 |

\* cited by examiner

BEARING ARRANGEMENT

FIELD OF THE INVENTION

The invention relates to a bearing arrangement for a component, such as a cylinder, roller, drum, or shaft, to be mounted, wherein this component rotates about an axis, with this bearing arrangement comprising at least one rolling bearing that is held in a bearing housing and is mounted so that it can move linearly in an arrangement housing by means of at least one linear guide, and also comprising an adjustment device for causing a linear adjustment movement of the bearing housing perpendicular to the axis between a rest position and a working position.

BACKGROUND

Such bearing arrangements with linear adjustable rolling bearings are used, for example, in printing machines for roller engagement and disengagement. An example of such a bearing arrangement is known from DE 101 45 322 A1. A hydraulic cylinder that is loaded with a pressure, is provided there as an adjustment device, in order to move the bearing housing together with the rolling bearing to engage the supported roller, that is, to move it against the second printing roller. The printing material runs between the two rollers, that is, ultimately a narrow gap is given for the printing material that necessarily runs in contact between the printing rollers. The printing rollers are mutually pressed against each other. Depending on the system, this could be a vibration-loaded system, that is, due to the roller rotation and the passage of the printing material, vibrations are transmitted to the moving, engaged roller. These vibrations are transmitted to the moving, engaged roller. The vibrations are in the pm range.

Although good roller engagement and disengagement can be achieved with such a known bearing arrangement, the system nevertheless could be improved. On one hand, the hydraulic cylinder is constantly under a high pressure when the roller is engaged, that is, in the working position. This is associated with an increased risk of wear in the hydraulic sealing system. On the other hand, the continuous vibration load increases the risk of wear, because naturally the hydraulic system is also exposed to continuous loads at a higher rate due to the vibration.

SUMMARY

Therefore, the invention is based on the objective of providing a bearing arrangement of the type noted above that is improved with regard to wear resistance.

To achieve this objective, for a bearing arrangement of the type noted above, it is provided according to the invention that the adjustment device comprises at least one pre-tensioned spring element that presses the bearing housing into the working position, as well as at least one hydraulic or pneumatic device for generating a restoring force that works against the spring element for moving the bearing housing into the rest position.

In the bearing arrangement according to the invention, the force that is required for moving the bearing housing and thus the rolling bearing from the rest position into the working position is generated by at least one pre-tensioned spring element. That is, the supported roller or similar component is engaged just by the force exerted by the spring element on the bearing housing. A hydraulic or pneumatic actuator is not provided. Such a device is used just for returning the bearing housing from the working position into the rest position, thus, to disengage the roller. This hydraulic or pneumatic device works against the spring element.

If the roller is to be engaged, then all that is necessary is to remove the load from the hydraulic or pneumatic device. The pre-tensioned spring element presses the bearing housing into the working position; the roller is engaged. Now if there are any vibrations in this working position, these do not have any damaging effects on the hydraulic or pneumatic device, because the seals are not pressed by the operating pressure onto the counter running surface during operation subject to vibrations. The vibrations are merely received and absorbed by the spring element.

If the roller is to be disengaged again, then the hydraulic or pneumatic device is actuated, which generates a pressure or force that is high enough that the spring element is compressed again and the coupled bearing housing is moved back into the rest position. Because the supported roller does not operate in this position, there is also no transfer of vibrations into the hydraulic or pneumatic system, which thus is not loaded. In addition, the hydraulic or pneumatic device is activated only when the roller is to be disengaged, that is, to be moved into the rest position.

Overall, the bearing arrangement according to the invention, in which the hydraulic or pneumatic device is used only for moving into the rest position, enables significantly lower loading of the hydraulic or pneumatic device, according to which the pressure piston of the hydraulic or pneumatic device is not subjected to pressure in the working position. Consequently, the wear of the sealing system can be significantly reduced.

The spring element obviously must be designed so that it generates a sufficient force to cause the linear adjustment. If possible, one spring element is sufficient. It is also conceivable, however, to provide two or more spring elements that are then arranged distributed preferably symmetric relative to the hydraulic or pneumatic device or devices. If, for example, two spring elements and one hydraulic or pneumatic device are used, then the hydraulic or pneumatic device is preferably arranged centrally between the two spring elements, in order to achieve the most symmetrical force or pressure distribution possible. In addition to the use of several spring elements, obviously multiple hydraulic or pneumatic devices could also be used. This is preferred especially when high forces are to be generated by means of the spring element or elements, consequently, very strong springs that require a high restoring force, are used.

The adjustment device itself comprises a housing, wherein a bolt arranged movably in the housing is allocated to the spring element or to each spring element, wherein this bolt is pressed by the spring element against the bearing housing and can be loaded with the restoring force generated by the hydraulic or pneumatic device or devices. The bearing housing is consequently coupled by the bolt or bolts with the spring elements, wherein the motion coupling of the bearing housing to the hydraulic or pneumatic device or devices is also provided by these bolts. The latter has a hydraulic or pneumatic piston that can be loaded with pressure by means of a hydraulic fluid or compressed air and that is motion-coupled with one or more bolts. The hydraulic or pneumatic device is preferably integrated in the housing, so that a compact unit is produced.

This motion coupling is preferably realized by a coupling plate that has the bolt or each bolt. The hydraulic or pneumatic piston interacts with this coupling plate, so that movement of the hydraulic or pneumatic piston is transferred via this coupling plate to the coupled bolt or bolts loaded by means of the spring elements. Here it is preferred when several of these bolts are connected to each other by a common coupling plate. That is, a hydraulic or pneumatic device can actuate multiple bolts by this one coupling plate. If, for example, there are two such bolts, then these are connected by a common coupling plate, wherein the hydraulic or pneumatic piston acts on this coupling plate so that both bolts can be actuated by means of a common hydraulic or pneumatic device.

The connection of the hydraulic or pneumatic piston with a coupling plate can be achieved in an especially simple way if the bolt or bolts project with one end out of the housing, wherein the coupling plate is arranged outside of the housing. That is, the spring-loaded bolts are guided on one side out of the housing or interact on this side with the bearing housing and on the other side they are guided out of the housing and provided with the coupling plate.

In the housing itself, there are preferably one or more cylindrical receptacles for each spring element and a bolt that passes through the spring element, wherein the spring element or each spring element is supported on one side on the housing and on the other side acts on the bolt.

Furthermore, in the housing for forming the hydraulic or pneumatic device there is preferably a cylindrical receptacle space in which the hydraulic or pneumatic piston is supported and in which receptacle space the hydraulic fluid or the compressed air is guided via a connection. That is, the hydraulic or pneumatic device is integrated directly on the housing side, consequently, the cylindrical receptacle space, thus ultimately the cylinder in which the hydraulic or pneumatic piston is guided, is formed directly on the housing side. The housing itself is preferably mounted directly on the arrangement housing that is installed fixed in position on the machine frame in the assembled position.

BRIEF DESCRIPTION OF THE DRAWINGS

A preferred embodiment of the bearing arrangement according to the invention is explained in more detail below with reference to the accompanying drawings. Shown are.

DETAILED DESCRIPTION OF THE PREFERRED EMBODIMENTS

Figure 1:
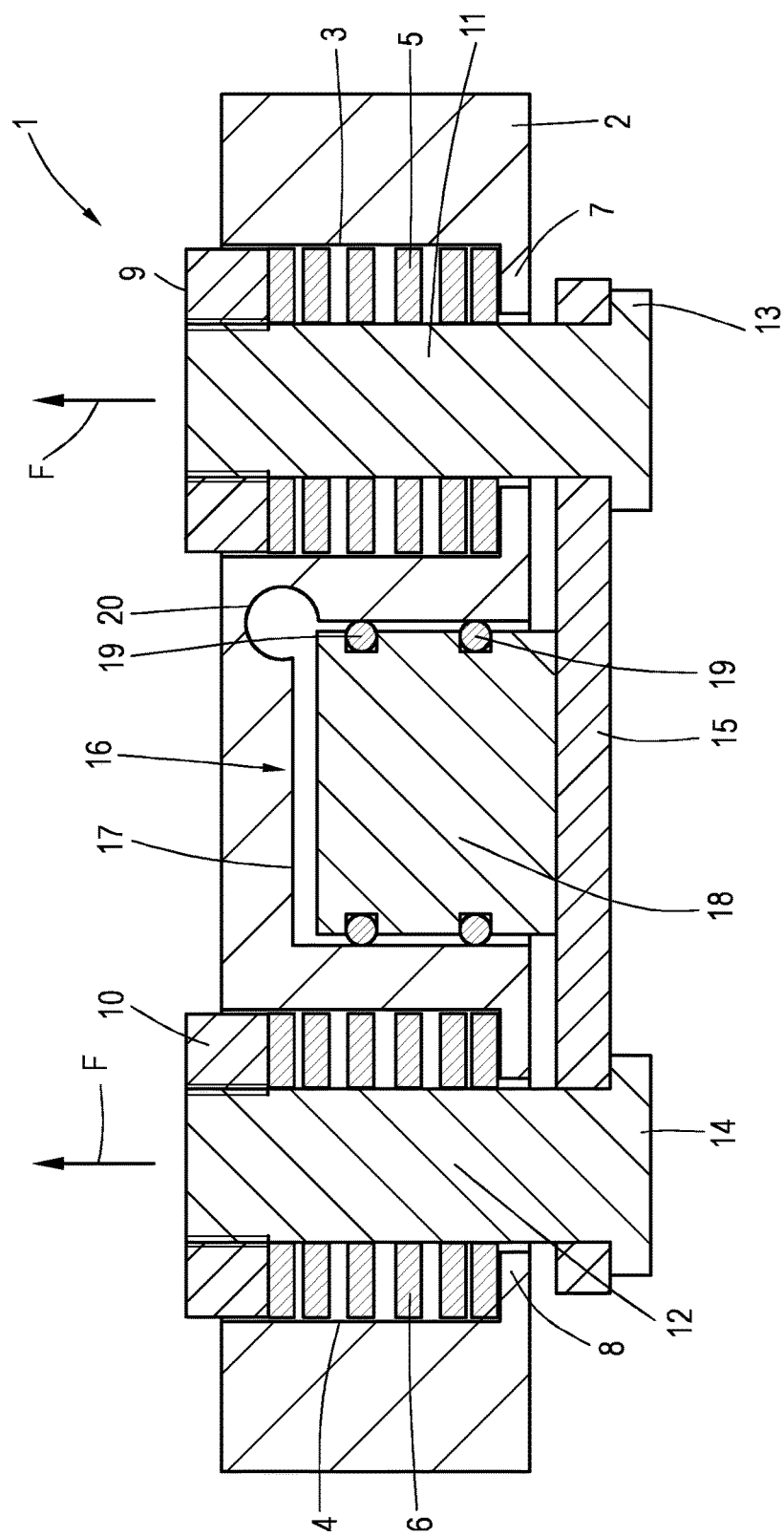
FIG. 1 a basic diagram of an adjustment device according to the invention for a bearing arrangement according to the invention, in a section view, and FIG. 2 a bearing arrangement according to the invention with the actuator in a cross-sectional view.

FIG. 1 shows an adjustment device 1 according to the invention, comprising a housing 2 in which, in the shown embodiment, two cylindrical receptacle spaces 3, 4 are provided, in each of which a spring element 5, 6 is housed. These are high-load springs with a rectangular winding cross section that makes it possible to generate high adjusting forces. The springs are supported with one end on each base 7, 8 of the recess 3, 4. With the other end, they are supported on a pressure piece 9, 10 that is provided, in particular, screwed onto each bolt 11, 12 arranged in the receptacle 3, 4. The spring elements 5, 6 are pre-tensioned. They make it possible to exert a pressure force, as indicated by the two arrows F, on the bolt 11, 12 together with the piston disk 9, 10 that presses the bolt out of the housing 2. A bearing housing in which a rolling bearing is provided in which, in turn, a bearing journal of the component is held is coupled with these two bolts 11, 12 together with the piston disk 9, 10, so that this bearing housing can be moved linearly, which will be discussed more in connection with FIG. 2.

The bolts 11, 12 pass through the housing 2 or the respective receptacle spaces 3, 4. On their two free ends they are provided with corresponding sections 13, 14 that have expanded diameters and by which a coupling plate 15 that connects the two bolts 11, 12 to each other on the outside of the housing is supported or fixed. The piston movement is coupled by means of this coupling plate 15.

Also integrated in the housing 2 is a hydraulic or pneumatic device 16. This is formed by a cylindrical receptacle space 17 that forms the hydraulic or pneumatic cylinder, as well as a hydraulic or pneumatic piston 18 guided movably therein. On the hydraulic or pneumatic piston 18, in the shown example there are two sealing rings 19 by means of which it is sealed relative to the cylindrical receptacle space 17. By a corresponding hydraulic fluid or compressed air connection 20, the corresponding medium can be fed, by which the hydraulic or pneumatic piston 18 can be pressed out of the cylindrical receptacle space 17 and thus out of the housing 2. The hydraulic or pneumatic piston 18 presses with its planar surface against the coupling plate 15. For the symmetric arrangement of the two bolts 11, 12 shown in FIG. 1, it presses laterally relative to the hydraulic or pneumatic device 16 and ultimately centrally on the coupling plate 15.

The function of the adjustment device 1 is such that the spring elements 5, 6 press the two bolts 11, 12 out of the housing 2 in the direction of the force arrows F when the hydraulic or pneumatic device 16 is not actuated, that is, is not pressurized. A bearing housing coupled with this is thus shifted linearly according to which the housing 2 is fixed in position. The hydraulic or pneumatic piston 18 is here moved into the cylindrical receptacle space 17 by the coupling plate 15.

If the restoring action is performed, then the corresponding pressure medium is guided into the cylindrical receptacle space 17 with high pressure via the connection 20, which has the effect that the hydraulic or pneumatic piston 18 is pressed out from the cylindrical receptacle space 17 and thus out of the housing 2. It presses against the coupling plate 19 that in turn carries along the two bolts 11, 12 and somewhat retracts them into the housing 2. The spring elements 5, 6 are here compressed again. This state remains until the hydraulic or pneumatic device is depressurized again. Then the two spring elements 5, 6 (here the two helical springs) push the two bolts 11, 12 back out of the housing 2.

Figure 2:
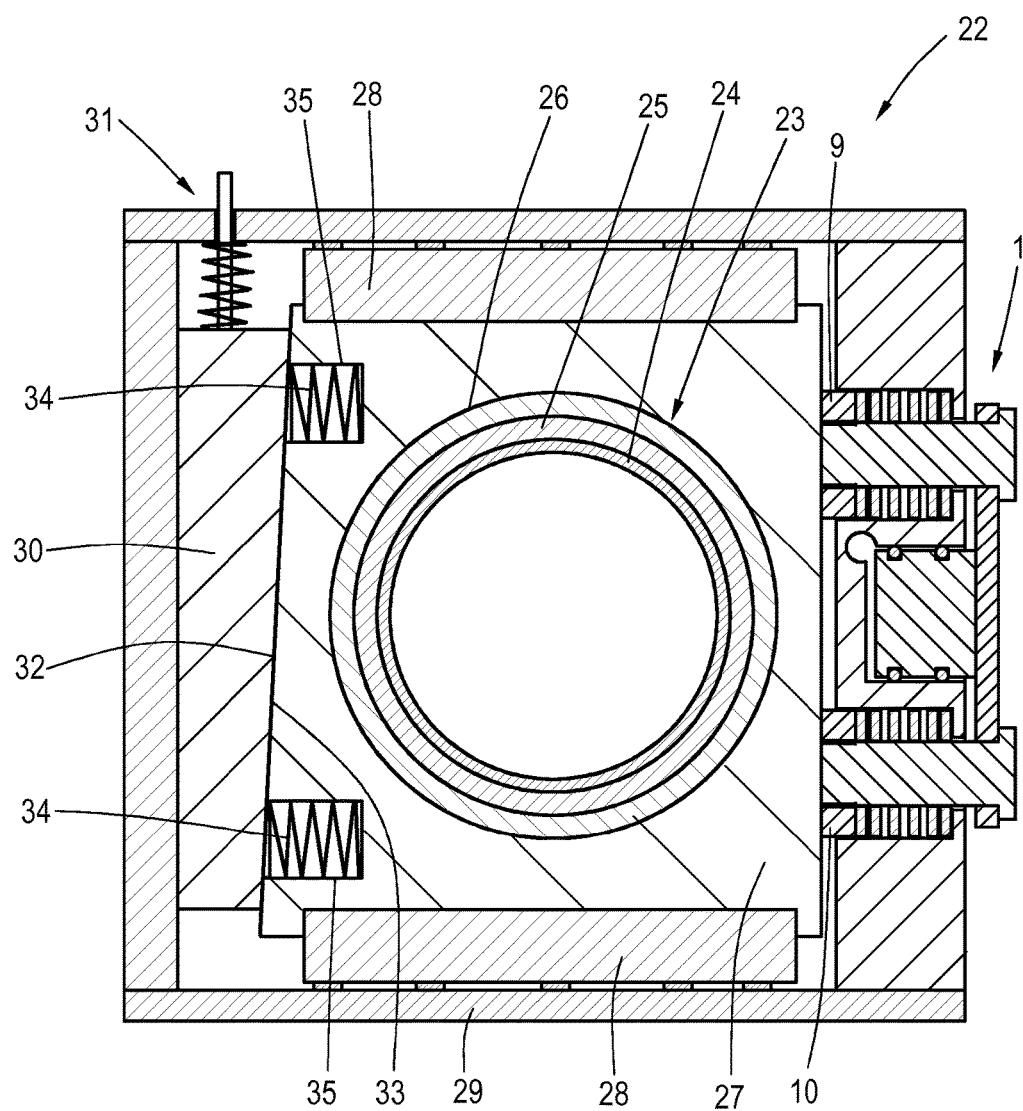

FIG. 2 shows a bearing arrangement 22 according to the invention, which is installed, for example, in a printing machine and is used for engaging and disengaging a printing roller supported by this arrangement. The bearing arrangement comprises a rolling bearing 23 that is designed, for example, as a cylindrical roller bearing with cylindrical rollers, but is not shown here in detail. This is the rotational bearing of a bearing journal of the printing roller or—if the bearing arrangement 22 is installed on a different type of machine—the corresponding rotating component to be supported. The rolling bearing 23 has, for example, an inner ring 24, the rolling body circle 25 not shown in more detail, and an outer ring 26 by which the rolling bearing 23 is held in a bearing housing 27. The bearing housing 27 is guided so that it can move linearly on its side by two linear guides 28, wherein these linear guides 28 are provided on an arrangement housing 29 by which the bearing arrangement 22 is installed on the machine.

The adjustment device 1 according to the invention that acts on the bearing housing 27 with the two bolts 11, 12 in addition to the piston disks 9, 10 is allocated to the bearing housing 27. The adjustment device 1 is connected rigidly to the arrangement housing 29.

On the opposite side of the arrangement housing 29 there is an adjustment wedge 30 that can be shifted linearly by means of an adjustment device 31 not shown in more detail. By means of the position of the adjustment wedge 30 or its wedge surface 32, the maximum linear movement path of the bearing housing 27 is defined, which contacts the wedge surface 32 with a corresponding wedge surface 33 in the working position.

The function of the bearing arrangement is as follows: It is assumed that the bearing housing 28 is located in the rest position in which it is pushed to the right starting from the working position shown in FIG. 2 and a gap is produced between the two wedge surfaces 32, 33. The bearing housing 27 should be moved into the working position. For this it is necessary to switch the hydraulic or pneumatic device 16 to a depressurized state. This has the effect that the two strongly compressed spring elements 5, 6 move the bearing housing 27, which contacts, as described, the bolts 11, 12 in addition to the piston disks 9, 10, to the left in FIG. 2, guided by the linear guides 28. This adjustment position is realized until the wedge surface 33 contacts the wedge surface 32. In this state, the spring elements 5, 6 are naturally not yet released from pressure, they still press with high force on the bearing housing 27. The working position is achieved; the supported component, for example, a printing roller, rotates.

If the bearing arrangement 22 is now brought into the rest position, starting from this working position shown in FIG. 2, then hydraulic fluid or compressed air is fed via the connection 20. The piston 18 is loaded and pressed out of the cylindrical receptacle space 17, wherein it carries along the two bolts 11, 12 via the coupling plate 15. The bearing housing 27 is released from pressure. By means of the two restoring forces 34 that are arranged in corresponding receptacles 35 on the bearing housing 27 and that contact the wedge surface 32 in a compressed state in the working position (see FIG. 2), the bearing housing 27 is now pressed away from the wedge surface 32 and shifted, starting from FIG. 2, to the right into the rest position. In this position, the bearing housing 27 contacts the housing 2. This state is maintained until the hydraulic or pneumatic device 16 is pressurized. If it is depressurized again, then the spring elements 5, 6 shift the bearing housing 27 back into the working position shown in FIG. 2.

| | List of reference numbers |
|---|---|
| 1 | Adjustment device |
| 2 | Housing |
| 3 | Receptacle space |
| 4 | Receptacle space |
| 5 | Spring element |
| 6 | Spring element |
| 7 | Base |
| 8 | Base |
| 9 | Pressure piece |
| 10 | Pressure piece |
| 11 | Bolt |
| 12 | Bolt |
| 13 | Fastening element |
| 14 | Fastening element |
| 15 | Coupling plate |
| 16 | Hydraulic or pneumatic device |
| 17 | Receptacle space |
| 18 | Hydraulic or pneumatic piston |
| 19 | Sealing rings |
| 20 | Hydraulic or compression connection |
| 22 | Bearing arrangement |
| 23 | Rolling bearing |
| 24 | Inner ring |
| 25 | Rolling body circle |
| 26 | Outer ring |
| 27 | Bearing housing |
| 28 | Linear guides |
| 29 | Arrangement housing |
| 30 | Positioning circle |
| 31 | Adjustment device |
| 32 | Wedge surface |
| 33 | Wedge surface |
| 34 | Restoring spring |
| 35 | Receptacles |

The invention claimed is:

1. A bearing arrangement for a component to be mounted, in which said component rotates about an axis, said bearing arrangement comprising at least one rolling bearing that is held in a bearing housing and is mounted to move linearly in an arrangement housing by at least one linear guide, an adjustment device for causing a linear adjustment movement of the bearing housing perpendicular to the axis between a rest position and a working position, the adjustment device comprises at least one pre-tensioned spring element that presses the bearing housing into the working position, and at least one hydraulic or pneumatic device for generating a restoring force working against the at least one spring element for moving the bearing housing into the rest position, wherein the adjustment device comprises a housing and a bolt movably arranged in the housing that is allocated to the at least one spring element, said bolt is pressed by the at least one spring element against the bearing housing and is loaded with the restoring force generated by the at least one hydraulic or pneumatic device.

2. The bearing arrangement according to claim 1, wherein two or more of the spring elements are provided that are arranged in a symmetric distribution relative to the at least one hydraulic or pneumatic device.

3. The bearing arrangement according to claim 1, wherein the at least one hydraulic or pneumatic device is integrated in the housing.

4. The bearing arrangement according to claim 1, wherein said bolt includes bolts, and the at least one hydraulic or pneumatic device has a hydraulic or pneumatic piston that is loaded with pressure by hydraulic fluid or compressed air and that is motion-coupled with the bolts.

5. The bearing arrangement according to claim 4, wherein the bolts have a coupling plate with which the hydraulic or pneumatic piston interacts.

6. The bearing arrangement according to claim 5, wherein the bolts are connected to each other by the coupling plate which is a common coupling plate.

7. The bearing arrangement according to claim 5, wherein the bolts each project with one end out of the housing, and the coupling plate is arranged outside of the housing.

8. The bearing arrangement according to claim 7, wherein one or more cylindrical receptacle spaces are provided in the housing, with the at least one spring element and one of the bolts passing through the at least one spring element being provided for each of the receptacle spaces, and the at least one spring element is supported on the housing on one side of the at least one spring element and attaches to the bolt on an other side of the at least one spring element.

9. The bearing arrangement according to claim 7, wherein a cylindrical receptacle space is provided in the housing for forming the at least one hydraulic or pneumatic device, and the hydraulic or pneumatic piston is supported in said receptacle space and the hydraulic fluid or compressed air is guided into said receptacle space by a connection.

\* \* \* \* \*